United States Patent Office 3,240,317
Patented Mar. 15, 1966

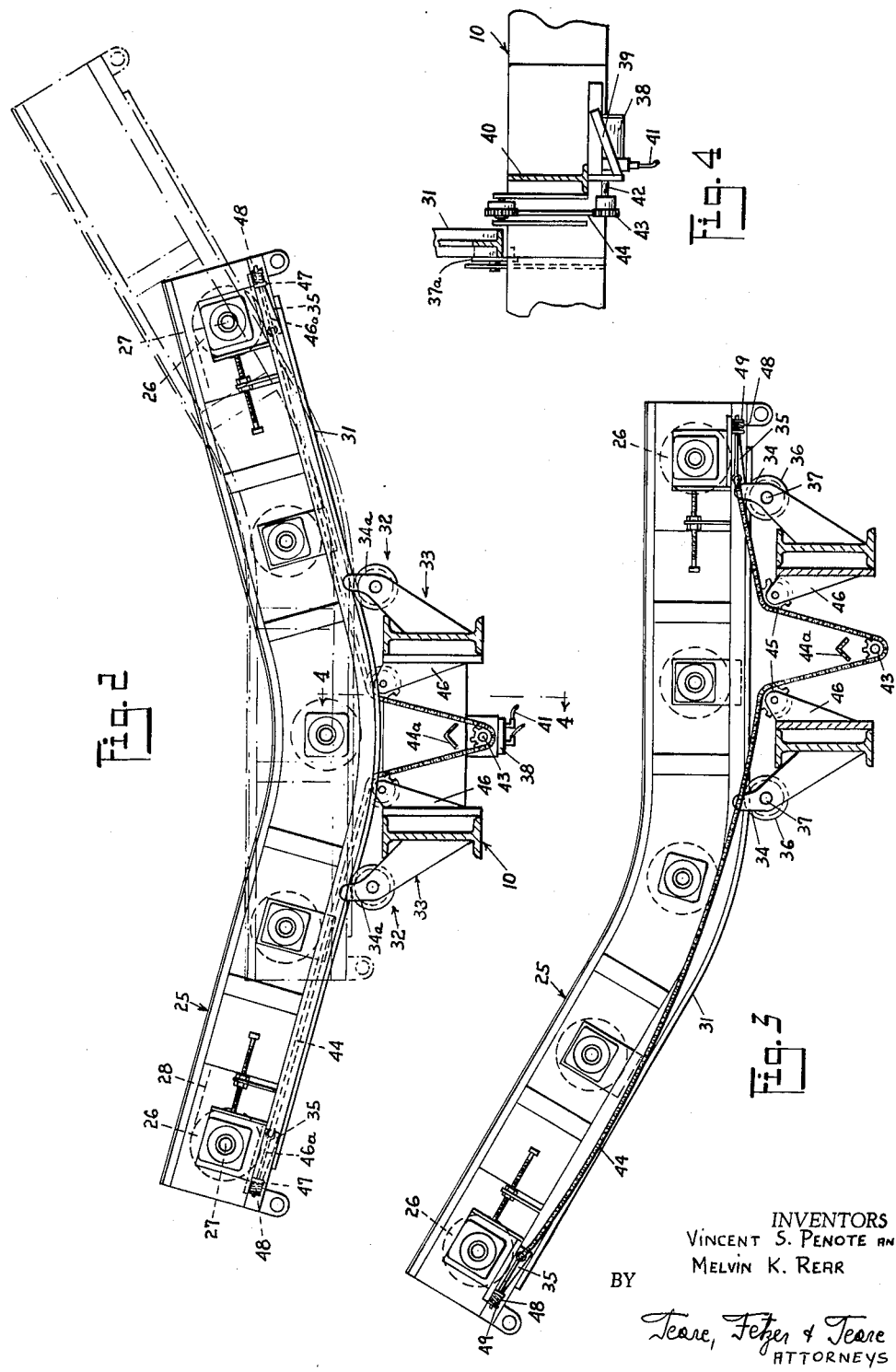

3,240,317
DISCHARGE MECHANISM
Vincent S. Penote, Shaker Heights, and Melvin K. Rear, Chesterland, Ohio, assignors to The Cleveland Trencher Company, Cleveland, Ohio, a corporation of Ohio
Filed Oct. 24, 1963, Ser. No. 318,541
6 Claims. (Cl. 198—117)

This invention relates to excavating machines and more particularly to an improved mechanism for moving the discharge conveyer thereof transversely of the machine to enable excavated materials to be selectively discharged to either side of the machine.

Heretofore, various arrangements for transverse shifting of the discharge conveyor have been utilized in conjunction with trench-type excavating machines for transferring materials from an excavation. In such arrangements, the conveyer frame has been provided with a rack coacting with a pinion carried by a gear housing mounted on the conveyer support and containing a worm gear reduction unit for shifting the conveyer transversely of the machine. It has been experienced that in such arrangements excavated materials collect on the rack causing serious interference with, and damage to the shifting mechanism. Such mechanisms are not only space consuming but are costly and do not provide for trouble-free operation of the machine.

In another arrangement the conveyer frame has theretofore been provided with a double-acting piston and cylinder unit in conjunction with a cable and pulley arrangement connected between the piston and the conveyer support to shift the conveyer upon actuation of the cylinder and piston unit. Difficulty has been encountered in connection with such arrangement due to the interference by, and consequent damage to the fluid pressure feed lines carried by the piston and cylinder unit. Further difficulty has been encountered in connection with such arrangement due to the fact that the piston and cylinder unit is generally positioned adjacent either end of the conveyer frame, where it is not only exposed to materials inadvertently discharged from the conveyer, but where it may come into contact with the excavation, thereby resulting in clogging or damage to the shift mechanism. Moreover, such multiple cable arrangements require considerable maintenance and do not afford the precise control for the shifting movement of the conveyer mechanism.

Accordingly, it is an object of the present invention to provide an improved conveyer shift mechanism which embodies a rugged, maintenance free, compact construction and which can be more quickly and efficiently actuated as compared to previously known arrangements.

Another object of the present invention is to provide an improved conveyer shift mechanism for use with an excavating machine, wherein the conveyer frame is mounted for transverse shifting movement relative to the conveyer support, which transverse shifting movement is accomplished by a stationary, fluid powered motor unit mounted on the conveyer support in conjunction with a sprocket drive arrangement coacting between a motor unit and the conveyer frame for shifting the latter in the general direction of movement of said sprocket drive upon actuation of said motor unit.

Another object of the present invention is to provide an improved conveyer shift mechanism of the latter type in conjunction with means coacting between the conveyer frame and the conveyer support to provide a predetermined limited transverse shifting movement thereof.

A further object of the present invention is to provide an improved conveyer shift mechanism of the latter type which includes a resilient interconnection between the conveyer frame and the conveyer support member to maintain a predetermined resilient tension therebetween during transverse shifting movement of the conveyer.

Briefly, the foregoing objects are accomplished in accordance with the present invention by the provision of a discharge conveyer mechanism comprising a discharge conveyer having a frame mounted for lateral shifting movement relative to the machine in conjunction with means for shifting the conveyer frame transversely relative to the conveyer support. Said means comprises a stationary, fluid powered motor unit, preferably of the hydraulically reversible type, mounted on the support, and a flexible driven element coacting with the motor unit and attached to the conveyer frame for shifting the latter in the general direction of movement of the flexible driven element upon actuation of the motor unit.

The invention further includes a resilient interconnection between the flexible driven element and the conveyer frame, for maintaining a predetermined tension on the element during transverse shifting movement of the conveyer frame, and a stop means on the conveyer frame adapted for engagement with an abutment means on the conveyer support to provide a predetermined limited transverse shifting movement of the conveyer frame relative to the conveyer support.

Other features and advantages of the invention will be apparent from the following description taken in conjunction with the accompanying drawings, wherein:

FIG. 2 is a fragmentary elevational view of the discharge conveyer of the machine and associated conveyer shift mechanism taken along line 2—2 of FIG. 1, and showing in solid lines the center position of the conveyer on the conveyer support; and in broken lines the extreme right hand or discharge position of the conveyer;

FIG. 3 is a fragmentary elevational view similar to that of FIG. 3 but taken along the line 3—3 of FIG. 1 and thus showing the conveyer is solid lines from the opposite side and in the extreme left hand or discharge position; and FIG. 4 is a fragmentary vertical section view taken generally along the line 4—4 of FIG. 2.

Figure 1:
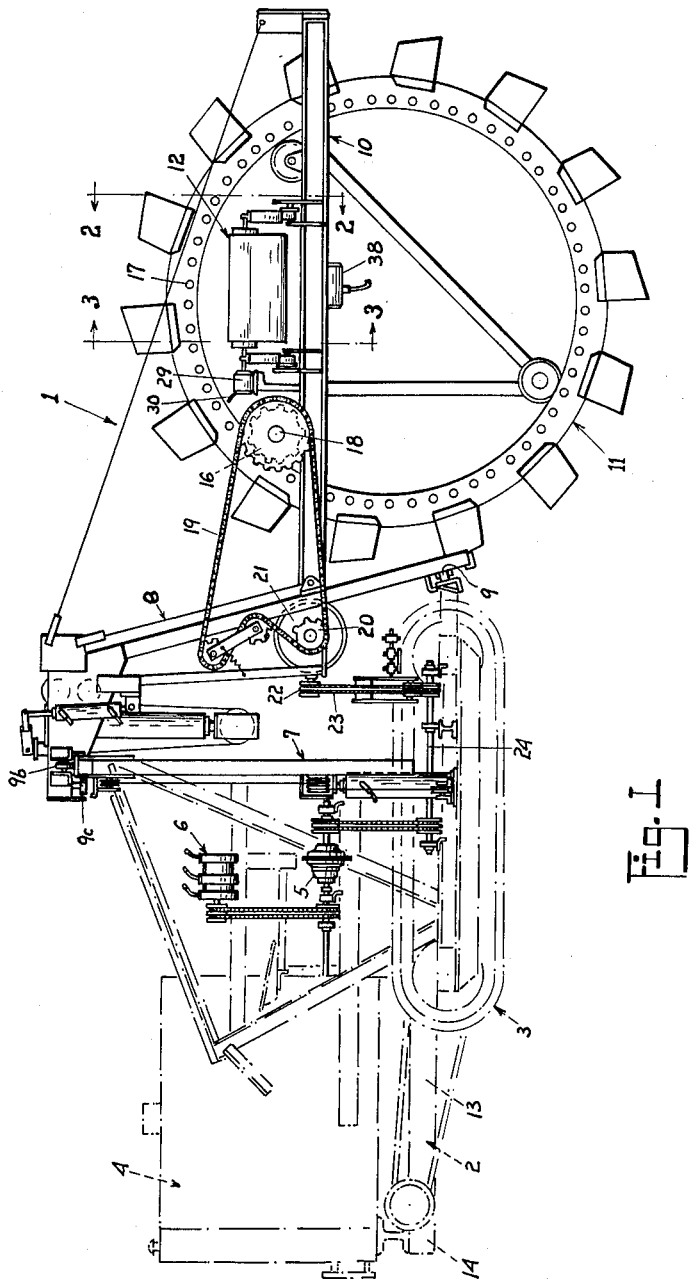
FIG. 1 is a side elevation view of an excavating machine embodying the invention.

Referring now again to the drawings and in particular to FIG. 1 thereof, the invention is illustrated as being applied to the environment of a crawler propelled excavating machine, designated at 1. Such machine broadly includes a base frame 2 supported on suitable crawler treads 3 for movement along the ground. A motor 4 is shown mounted on the forward end of the machine with a powered take-off unit 5 disposed behind the motor, and a hydraulic pump unit 6 operably connected to the aforementioned motor unit 4. A main mast structure 7 is mounted on the frame for supporting thereon a supplementary mast structure 8, which supplemental mast structure incorporates roller members 9, 9b and 9c thereon for anti-friction, transverse shifting movement of the mast 8 relative to the machine chassis. An elongated digging boom structure 10 is mounted for vertical movement on the supplemental mast 8 and is provided at its free end with an endless, bucket-type digging unit 11 rotatably mounted thereon, and an unloading conveyer 12 extending transversely through the digging unit 11 for lateral shifting movement relative thereto and to the machine chassis.

The base frame structure 2 is generally of a conventional construction and includes a base member 13 (FIG. 1) and forwardly extending sills 14 for mounting motor 4 thereon.

The digging unit 11 is preferably driven by means of sprocket wheels 16 which engageably coact with a plurality of circumferentially spaced pins 17 disposed on both sides of the digging unit 11. The sprocket wheels 16 are drivingly mounted on a shaft 18 which, in turn, is connected by any suitable means, such as a drive chain 19, to another sprocket wheel 20 connected to a differential unit 21 mounted on the supplemental mast structure 8. The differential unit 21 may include a sprocket wheel 22 extending forwardly thereof, which wheel is drivingly connected by means of a drive chain 23 to a sprocket wheel attached to a counter-shaft assembly 24 on the machine chassis.

Referring now again in particular to FIGS. 2 to 4 of the drawings, the unloading conveyer 12, to which this invention is primarily directed, is disposed to extend through the digging unit 11 and transversely of the machine chassis. As shown, the conveyer includes an arcuate (in side elevation) frame structure 25 which mounts at opposite ends thereof drums 26 rotatably mounted on shafts 27. An endless belt element 28 is trained around the drums 26 for removing excavated material from the digging unit 11 and discharging it transversely to either side of the machine chassis, as will hereinafter be more fully described.

Actuation of the endless belt element 28 is accomplished by means of a hydraulic motor unit 29 (FIG. 1) connected to the shaft 27 on one end of the conveyer, which motor communicates by suitable feed lines 30 to the aforementioned pump unit 6. A suitable control valve mechanism (not shown) may be provided in circuit with the pump unit 6 to regulate the flow of pressurized fluid to the motor 29, such that the motor may be driven in either direction, thereby to provide for reversing the direction of travel of the endless belt element 28 of the conveyer.

The conveyer frame 25 mounting the endless belt element 28 generally includes spaced, arcuate-like rail members 31 which are preferably mounted on opposed pairs of roller units, designated generally at 32, disposed on the boom structure 10 for anti-friction movement of the conveyer during transverse shifting thereof. The roller units 32 preferably include generally U-shaped bracket members 33 having oppositely disposed, parallel side plates 34 which extend outwardly and angularly upwardly in the general direction of the conveyer frame 25. The outer side plates of the respective U-shaped bracket members 33 include generally planar abutment portions 34a which extends above and exteriorly of the rail members 31 and which are adapted to engageably coact with stop blocks 35 fixedly disposed adjacent the opposite ends of the conveyer frame 25 to provide a predetermined limited transverse shifting movement of the conveyer either to the right or to the left, as viewed if FIGS. 2 and 3 of the drawings.

The conveyer frame 25 may be supported for transverse shifting movement on the U-shaped bracket members 33 by means of rollers 36 rotatably mounted on axles 37 which extend between the respective side plates 34 of each of the bracket members. The rollers 36 are preferably provided with upstanding peripheral flange portions 37a (FIG. 4) which overlap the arcuate-like rail members 31, such that the overlapping relationship therewith maintains the conveyer in the assembled condition on the boom structure 10.

In accordance with this invention, transverse shifting movement of the conveyer relative to the digging unit 11 and to the machine chassis is accomplished by a stationary, centrally oriented motor unit 38 in conjunction with a triangularly disposed sprocket drive arrangement. The stationary motor unit 38 is mounted within a support bracket 39 which, in turn, is attached to the underside of a cross plate 40 on the boom structure 10. The motor unit 38 is preferably of the hydraulically reversible type which may be connected to the pump unit 6 by means of suitable feed lines 41 and a suitable valve mechanism (not shown) of any conventional type to control the flow of pressurized fluid to the motor unit 38, thereby controlling transverse shifting movement of the conveyer either to the right or to the left.

As best viewed in FIG. 4, an out put shaft 42 from the motor unit 38 drivingly mounts a sprocket 43 which, in turn, engageably coacts with a single, flexible drive element 44, such as a sprocket chain. A generally triangularly shaped (in cross section) shield member 44a may be attached to the cross plate 40 of the boom 10 and disposed above the drive sprocket 43, such as to prevent the interference by foreign materials with the driving connection to the sprocket chain 44.

The sprocket chain 44 is looped around the drive sprocket 43 and extends divergedly upwardly and is then directed around a pair of oppositely disposed idler sprockets 45 which are mounted for free rotation on idler support brackets 46 attached to the boom structure 10. The sprocket chain 44 extends generally linearly upwardly from the idler sprockets 45 toward the opposed ends of the conveyer and is attached at its opposite ends to eye bolts 46a. The eye bolts 46a, in turn, pass through brackets 47 attached at each end of the conveyer to the arcuate-like rail members 31. A resilient member 48, such as a coil compression spring, is disposed around the free end of each of the eye bolts 46, such as to bear at one end against the bracket 47 and at its other end against a retaining lock nut 49 threadably engaged on the corresponding end of the eye bolt to maintain a predetermined tension on the sprocket chain 44 and to provide a resilient coupling between the conveyer and the conveyer shift mechanism. This resilient coupling affords a smooth, uniform starting and stopping of the conveyer during normal usage thereof and prevents inadvertent dislodgement of excavated materials from the conveyer.

In a typical application of the conveyer and upon actuation of the motor unit 38 in a counter-clockwise direction, tension is automatically applied to foreshorten one end of the sprocket chain 44 which causes the conveyer to be shifted from its center position (solid line) on the boom 10 to the right, as shown by broken lines in FIG. 2, while the other end of the sprocket chain 44 is lengthened and moves linearly in the general direction of movement of the conveyer until further transverse movement thereof is arrested by engagement of one of the stop blocks 35 against one of the corresponding abutment portions 34 disposed on the roller units 32. Conversely, reversal of the motor unit 38 in the opposite or clockwise direction causes automatic transverse shifting movement of the conveyer to the left (not shown) and in a manner as aforedescribed.

From the foregoing description and accompaning drawings, it can be seen that the conveyer shift mechanism of the present invention provides many important advantages compared to theretofore known arrangements for accomplishing removal of excavated materials from an excavating machine. In the present arrangement, a single, stationary, hydraulically reversible motor unit disposed on the boom structure in conjunction with the direct sprocket drive arrangement coupled to the conveyer provides a highly efficient transverse shifting movement thereof and in either direction relative to the digging unit and to the machine chassis. Such an arrangement effectively overcomes the inertia forces during initial starting of transverse shifting movement of the conveyer and thereby provides an arrangement which is more precisely responsive to manual control by the operator. Such conveyer shift mechanism obviates interference from and damage to hanging and/or movable feed lines thereby substantially reducing replacement and maintenance costs of operating the machine. In addition, the resilient coupling between the conveyer and the present conveyer shift mechanism effectively dissipates the primary shock forces coincident with initial transverse shifting and stopping of the conveyer which not only prevents loss of materials from the conveyer but which also substantially reduces wear and tear on the component parts of the machine.

While the discharged conveyer or shift mechanism has been illustrated in connection with a particular type of trench excavating machines, it will be understood that such mechanism may be readily used with other types of trench excavating machines, compactness, simplicity and durability of the structure is highly desirable.

The terms and expressions which have been employed herein are used as terms of description and not of limitation and there is no intention in the use of such terms and expressions of excluding any equivalents of the features shown and described or portions thereof, but it is recognized that various modifications are possible within the scope of the invention claimed.

We claim:

1. A discharge mechanism for use with an excavating machine or the like comprising, a support, a discharge conveyer including a frame and an endless belt movably supported on said frame, said conveyer being disposed for lateral shifting movement relative to said support, means for selectively driving said belt in either lengthwise direction, and means for shifting said conveyer frame transversely relative to said support, said shifting means including a rotary fluid powered motor unit mounted on the support, a flexible element engagably coacting with said motor unit and being fixed at each end thereof to the opposed longitudinal ends of said conveyer frame, said flexible element coacting with said motor unit upon actuation thereof to cause transverse shifting movement of said conveyer frame in a generally vertical plane and in the general direction of movement of said flexible element, said shifting means being completely independently operable with respect to said belt driving means.

2. A discharge mechanism in accordance with claim 1, including a stop means mounted on at least one end of said conveyer frame and adapted for engagement with an abuttment means on said support to provide a predetermined limited transverse shifting movement of said conveyer frame upon actuation of said motor unit.

3. A discharge mechanism in accordance with claim 1, including a resilient attachment between at least one end of said flexible element and the corresponding end of said conveyer frame for maintaining a predetermined resilient tension on said flexible element during transverse shifting movement of said conveyer frame.

4. A discharge mechanism in accordance with claim 3, wherein the resilient attachment includes a bracket member having an opening therethrough supported on said frame, a connecting member attached at one end to said flexible element and disposed to extend through the opening in said bracket member, and a coiled spring disposed around the other end of said connecting member and bearing against said bracket member.

5. A discharge mechanism in accordance with claim 1 including a pair of spaced, oppositely disposed idler means mounted on said support above said motor unit, said flexible element comprising a single stretch adapted to be actuated by said motor unit upon actuation of the later, said stretch extending upwardly around said idler means and then being fixed at its opposite ends to the ends of said conveyor frame.

6. A discharge mechanism in accordance with claim 1 wherein said support comprises a plurality of roller means mounted thereon, said conveyor frame including a pair of spaced, generally arcuate in side elevation, rail-like members mounted for antifriction transverse shifting movement on said roller means, said motor unit being disposed between said rail-like members and below said conveyor frame, a pair of spaced, oppositely disposed idler sprocket wheels mounted on said support, a drive sprocket operably connected to said motor unit, said idler sprocket wheels being disposed in a common plane with said drive sprocket, said flexible element comprising a sprocket chain having a single sprocket engaging stretch looped around said drive sprocket and then directed divergingly upwardly around said opposed idler sprocket wheels, the ends of said sprocket chain being resiliently fixed to the longitudinal ends of said conveyor frame.

References Cited by the Examiner
UNITED STATES PATENTS 2,598,339  5/1952  Askue _____ 198—111
2,753,971  7/1956  Ball _____ 198—96

FOREIGN PATENTS 202,666  7/1956  Australia.

SAMUEL F. COLEMAN, *Primary Examiner.*

ERNEST A. FALLER, *Examiner.*